(12) United States Patent
Ham

(10) Patent No.: US 7,264,062 B1
(45) Date of Patent: Sep. 4, 2007

(54) REMOTELY OPERABLE FIRE-FIGHTING VEHICLE

(76) Inventor: Edgardo Ham, 916 Ysidora Ave., Chula Vista, CA (US) 91910

( * ) Notice: Subject to any disclaimer, the term of this patent is extended or adjusted under 35 U.S.C. 154(b) by 131 days.

(21) Appl. No.: 11/152,735

(22) Filed: Jun. 15, 2005

(51) Int. Cl.
| | |
|---|---|
| A62C 27/00 | (2006.01) |
| A62C 25/00 | (2006.01) |
| A62C 31/07 | (2006.01) |
| A62C 31/05 | (2006.01) |
| A62C 31/12 | (2006.01) |
| E01H 3/02 | (2006.01) |
| B62D 55/00 | (2006.01) |

(52) U.S. Cl. .................... 169/52; 169/24; 169/70; 239/67; 239/172; 239/722; 180/9.1

(58) Field of Classification Search ........... 169/52, 169/24, 70, 51, 54, 91; 239/67, 69, 146, 239/172, 176, 271, 272, 289, 303, 722; 180/9.1, 180/6.7; 701/1, 2; 901/1

See application file for complete search history.

(56) References Cited

U.S. PATENT DOCUMENTS

| | | | | |
|---|---|---|---|---|
| 2,360,397 | A * | 10/1944 | Carpenter | 169/24 |
| 3,155,319 | A * | 11/1964 | Hammelmann | 239/722 |
| 3,567,136 | A * | 3/1971 | Garrett | 239/587.2 |
| 3,724,554 | A * | 4/1973 | Rupert et al. | 169/52 |
| 3,762,478 | A | 10/1973 | Cummins | |
| 3,840,074 | A * | 10/1974 | Clark | 169/24 |
| 4,875,526 | A * | 10/1989 | Latino et al. | 169/24 |
| 5,113,946 | A | 5/1992 | Cooper | |
| 5,836,398 | A * | 11/1998 | White | 169/24 |
| D403,030 | S | 12/1998 | Yue | |
| 5,860,479 | A | 1/1999 | LaFollette | |
| 6,029,750 | A | 2/2000 | Carrier | |
| 6,289,995 | B1 | 9/2001 | Fuller | |
| 6,899,189 | B2 * | 5/2005 | Overlach et al. | 180/9.1 |
| 6,922,615 | B2 * | 7/2005 | Pillar et al. | 701/1 |
| 2004/0231863 | A1 * | 11/2004 | Long | 169/52 |

* cited by examiner

Primary Examiner—Kevin Shaver
Assistant Examiner—Darren Gorman

(57) ABSTRACT

A remotely operably vehicle includes a body defining a cavity therebeneath and further includes a mechanism for remotely propelling the vehicle during operating conditions and a mechanism for remotely discharging fluids outwardly from the vehicle. The vehicle further includes a mechanism for remotely discharging fire retardant in a concentrated path outwardly and away from the vehicle. The fire retardant discharging mechanism includes a powder reservoir isolated from the central water reservoir. The vehicle further includes a video surveillance mechanism for remotely capturing images surrounding the target zone such that the operator can monitor the target zone from a safe and remote location. A central processing unit bears software instructions for causing the vehicle to perform a series of predetermined operations. The remote propelling mechanism includes a portable and hand-operable controller including a plurality of display screens for simultaneously displaying a plurality of images surroundings the target zone.

6 Claims, 6 Drawing Sheets

REMOTELY OPERABLE FIRE-FIGHTING VEHICLE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fire protection equipment, and more particularly, to a remotely operable fire-fighting vehicle.

2. Prior Art

Fighting wind driven brush fires in rugged terrain has been proven to be dangerous and difficult to accomplish. Fires of this type have devastated Southern California at least once a decade for many years, causing huge losses to property owners and insurance companies, as well as injuries and death. Present methods of fighting these fires have proven to be marginal at best, as year after year these fires burn from the San Fernando Valley to Malibu without containment.

Present methods of fighting these fires include conventional fire engines with man held fire hoses, helicopters, aircraft and men with picks and shovels. All these methods have proven to be inadequate to prevent the huge losses that have ensued. The helicopter has been marginally effective because it carries only 300 gallons of water which spreads over a considerable area and partially evaporates before reaching the source of the flames. Aircraft tankers carry up to a thousand gallons of water but suffer from the same limitations as the helicopters namely, evaporation and intermittent application of water. Also, both airborne vehicles are limited to daytime operation since flying at night is too dangerous.

Fire engines are not all terrain vehicles and must operate on roads and close to fire hydrants. Men with pick and shovels cannot operate close to the fire source safely and can be in danger of death or serious injury in case of sudden wind direction change. Patents have been granted for vehicles that can be operated by remote control allowing the fire fighters to remain at considerable distance from the flames and still apply water directly on the source of the flames.

These vehicles may only be effective under ideal conditions, namely having a source of water nearby and long hoses strong enough to feed the vehicle as it attacks the fire in rugged terrain. A fast moving wind driven brush fire would be difficult to contain with these devices due to their limited maneuverability. All of these devices require a source of water connected to the remote control vehicle by long hoses which would be difficult to control in the brush covered less than ideal terrain of Southern California.

Accordingly, a need remains for a self contained vehicle that can operate in rugged terrain, applying water directly to the source of the fire, for extended periods of time, with protection for the crew and heat shielded to protect the vehicle. The present invention satisfies such a need by providing a remotely operable fire-fighting vehicle that could be used to fight wildfires. Such an invention fulfills a need for a new approach in combating wildfires that so often plague the United States, particularly the dry, western regions. The use of a remote control enables it to combat fires in locations that would otherwise be too dangerous for firefighters, saving lives and preventing the spread of such fires.

BRIEF SUMMARY OF THE INVENTION

In view of the foregoing background, it is therefore an object of the present invention to provide a remotely operable vehicle for use in fighting dangerous and widespread fires. These and other objects, features, and advantages of the invention are provided by a vehicle including a rigid and secure body formed from fire-resistive material sized and shaped as a tank. The body defines a cavity therebeneath wherein the cavity is safely isolated from the environment during operating conditions.

The vehicle further includes a mechanism for remotely propelling the vehicle during operating conditions and a mechanism for remotely discharging fluids outwardly from the vehicle. Such a fluid discharging mechanism is partially housed within the cavity.

The vehicle further includes a mechanism for remotely discharging fire retardant in a concentrated path outwardly and away from the vehicle wherein the fire retardant discharging mechanism and the fluid discharging mechanism are independently and contemporaneously operable such that an operator can treat a target zone with at least one fire fighting agent. The fire retardant discharging mechanism is partially housed within the cavity.

The fire retardant discharging mechanism includes a powder reservoir housed within the cavity and isolated from the central water reservoir. A plurality of pumps are electrically mated to the central processing unit and in fluid communication with the powder reservoir. A plurality of spouts are directly engaged with the turret section and spaced from the first and second array of water spouts wherein the fire retardant pumps are coupled in series to the powder reservoir and the spout distribution manifold so that each the pump can be independently operated.

A spout distribution manifold is directly coupled to the fire retardant pumps for channeling selected quantities of fire retardant directly to the plurality of fire retardant spouts such that fire retardant can be annularly discharged while water is linearly discharged from the fluid discharging means during operating conditions.

The vehicle further includes a video surveillance mechanism for remotely capturing images surrounding the target zone such that the operator can monitor the target zone from a safe and remote location. Such a video surveillance mechanism is directly conjoined to the body. A central processing unit bears software instructions for causing the vehicle to perform a series of predetermined operations. Such a central processing unit is preferably housed within the cavity and isolated from harsh environmental conditions.

The remote propelling mechanism includes a portable and hand-operable controller including a plurality of display screens for simultaneously displaying a plurality of images surroundings the target zone. The controller further includes a pair of joy sticks for allowing the operator to selectively maneuver the vehicle along uneven terrain and further includes a plurality of user-activated controls spaced along a front face of the controller such that the operator can readily toggle the fire retardant discharging mechanism and the fluid discharging mechanism as needed.

An engine combustion mechanism is seated within the cavity and a drive mechanism is operably connected to the engine combustion mechanism for propelling the vehicle in such a manner that the vehicle can cross over rugged terrain and penetrate high-temperature regions not accessible by human fire fighters.

The drive mechanism includes at least one drive train electrically mated to the central processing unit and a plurality of unitary and flexible tracks operably mated to the drive train. A plurality of drive wheels are directly engaged with the tracks respectively and a plurality of suspension springs are directly coupled to the drive wheels and being compressible along respective vertical axes.

The fluid discharging mechanism includes a central water reservoir housed within the cavity of the body and a first array of adjustable water spouts directly conjoined to the body and protruding outwardly therefrom along a unidirectional and vertically registered path. A spout distribution manifold includes a plurality of valves directly connected to the central processing unit.

A plurality of pumps are directly mated with the central water reservoir and the spout distribution manifold. Such pumps are electrically coupled to the central processing unit for being selectively activated based upon a user input wherein the pumps are connected in series to the spout distribution manifold. A second array of adjustable water spouts are directly conjoined to the body and oppositely spaced from the first array of adjustable water spouts such that the first and second array of adjustable water spouts are oppositely directed at 180 degrees.

The video-surveillance mechanism preferably includes a camera electrically mated to the central processing unit and remotely operable by the controller and a global positioning satellite unit electrically and directly mated with the central processing unit and cooperating therewith for transmitting and receiving a user input over a dedicated wireless communications link. A transceiver is directly and electrically coupled to the central processing unit and the camera is directly secured to a top surface of the body such that the system can maintain a panoramic view of surrounding areas during operating conditions, wherein the vide surveillance mechanism generates and wirelessly transmits video signals to a central monitoring station such that an operator can remotely view a current state of the surrounding areas at a safe distance therefrom.

The body preferably further includes a turret section rotatably mounted on the body so that the turret section can be positioned along a 360 degree path and a motor and a gear operably mated therewith in such a manner that the gear is directly engaged with an inner serrated edge of the turret section. The motor is statically fixed to the cavity and causes the turret section to rotate during operating conditions.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
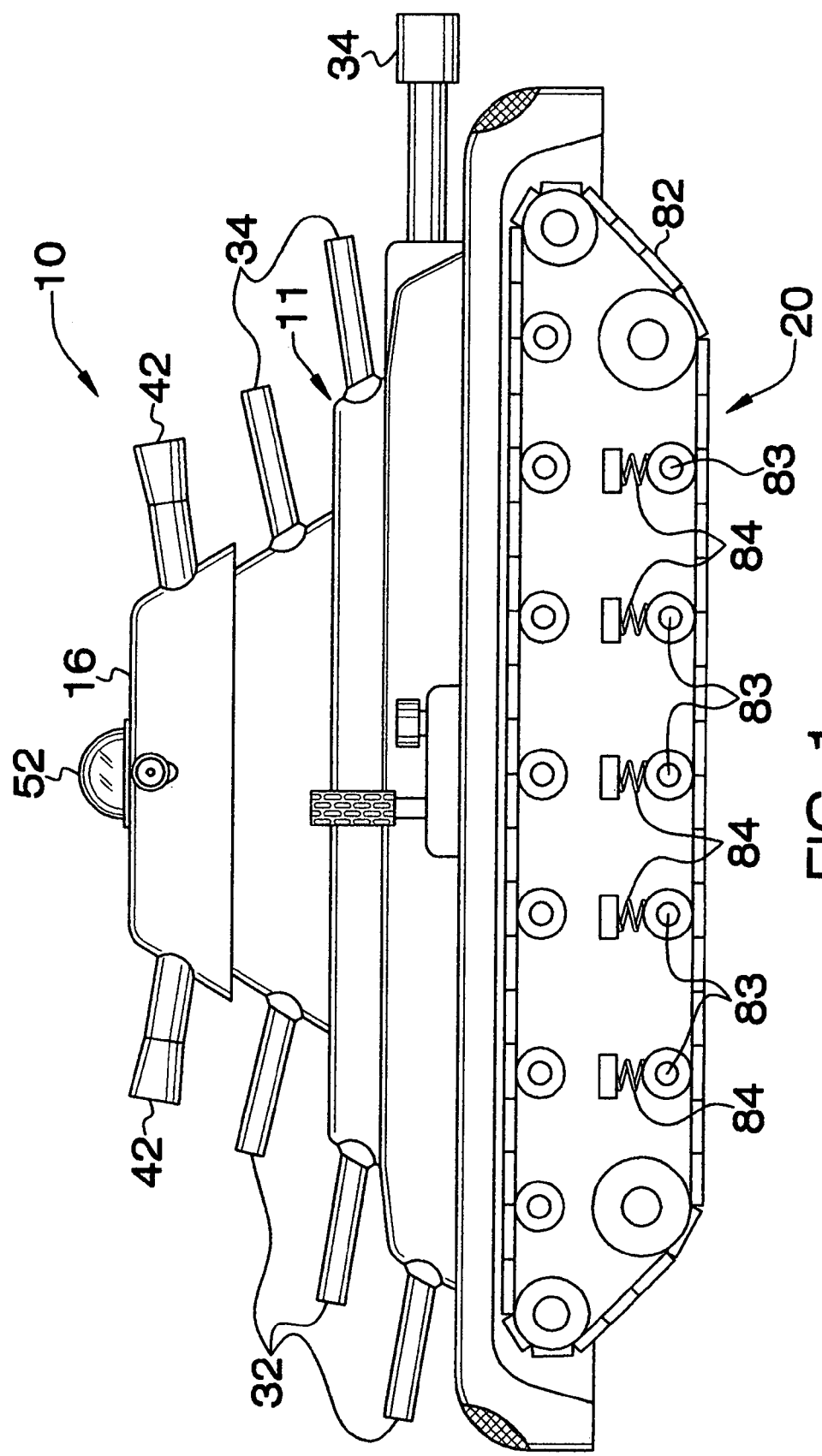
FIG. 1 is a side elevational view showing a remotely operable fire-fighting vehicle, in accordance with the present invention.
Figure 2:
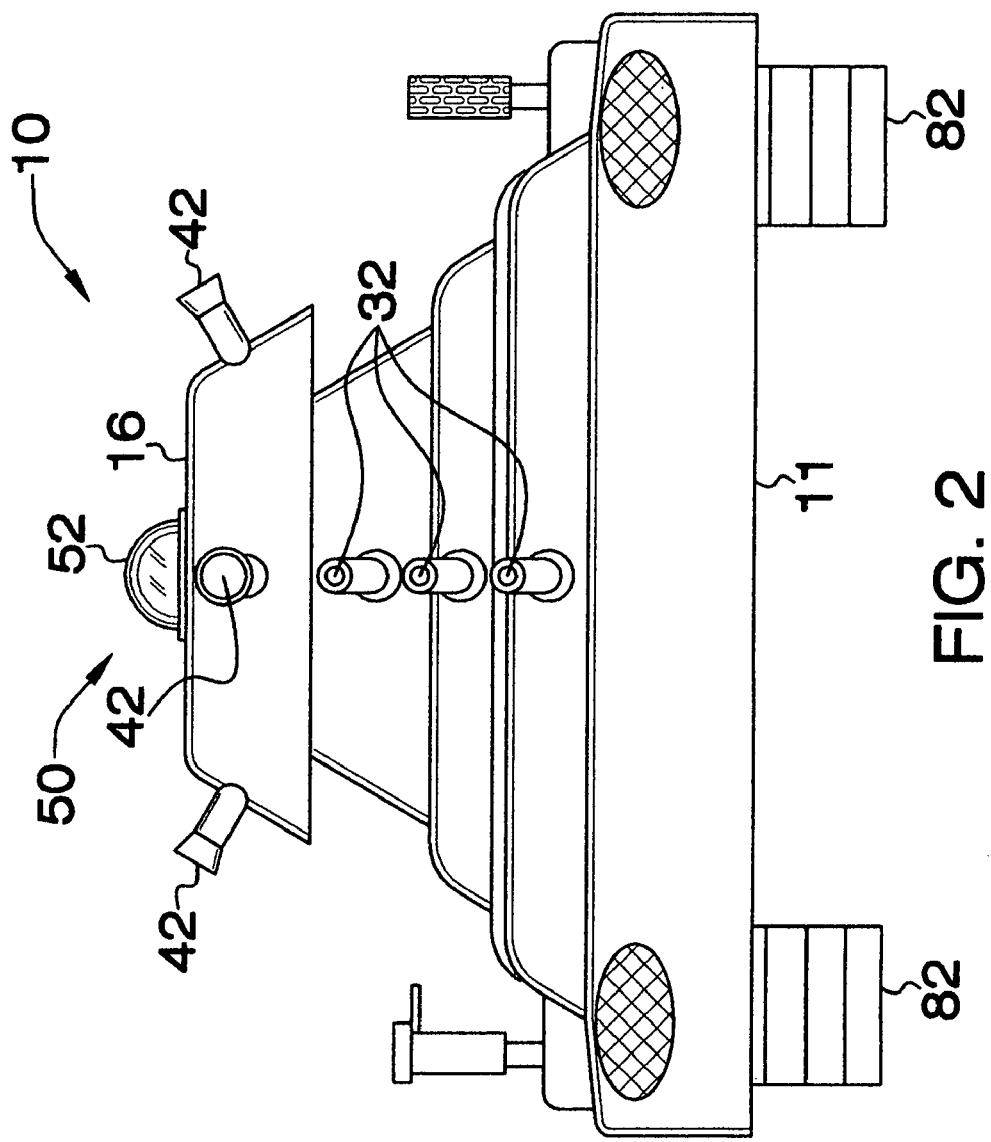
FIG. 2 is a rear elevational view of the vehicle shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-6 by the reference numeral 10 and is intended to provide a remotely operable vehicle for use in fighting dangerous and widespread fires. It should be understood that the vehicle 10 may be used to fight many different types of societal problems, such as riots, gangs, terrorists, urban unrest, demonstrators and other disruptive elements, and should not be limited to only fighting fires.

Figure 4:
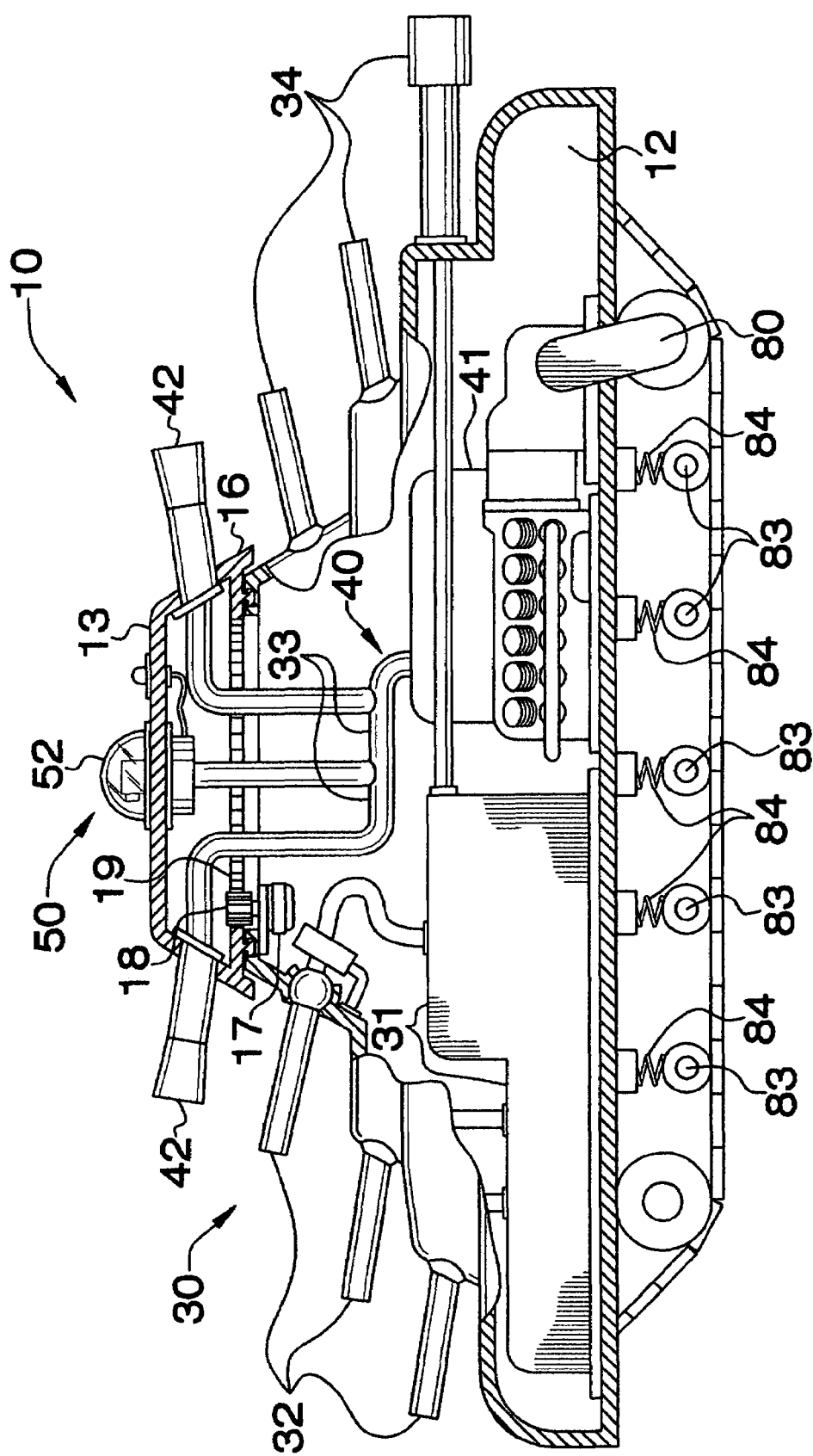
FIG. 4 is a cross-sectional view of the vehicle shown in FIG. 1, taken along line 4-4.

Initially referring to FIGS. 1 and 4, the vehicle 10 includes a body 11 defining a cavity 12 therebeneath wherein the cavity 12 is safely isolated from the environment during operating conditions. It is critical that the body 11 be formed from fire retardant material so the vehicle 10 can operate in the high temperature environment of a wildfire, and still protect the internal components of the vehicle 10 housed therein. Such fire retardant material may be ablative coating, as is obvious to one having ordinary skill in the art.

Figure 5:
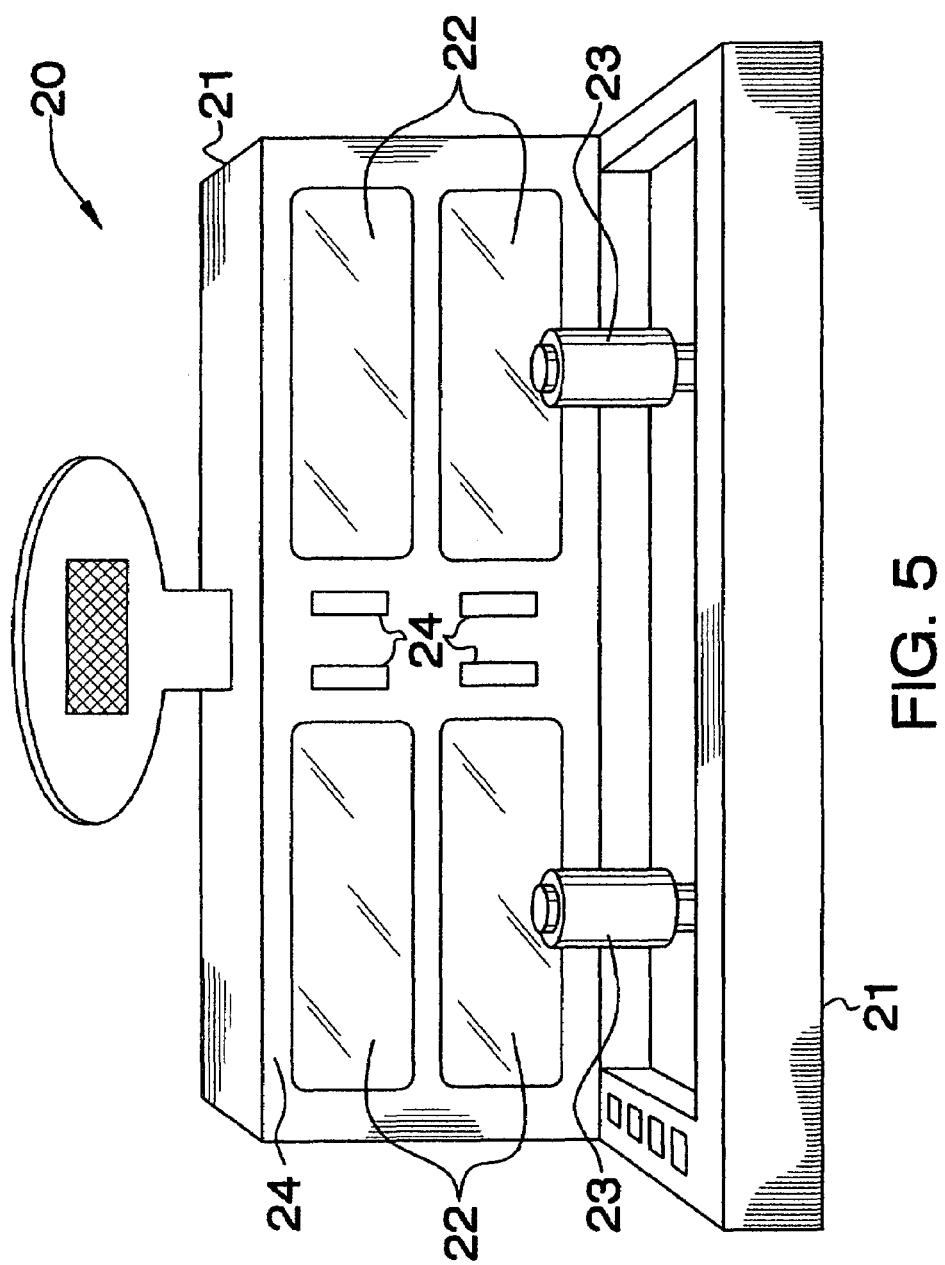
FIG. 5 is a perspective view of the controller.

The vehicle 10 further includes a mechanism 20 that is essential for remotely propelling the vehicle 10 during operating conditions, as shown in FIG. 5, and a mechanism 30 for remotely discharging fluids outwardly from the vehicle 10. Such a propelling mechanism 20 is preferably portable and easy to transport so a user can remain safely out of the reach of the fire's flames, yet close enough to monitor the performance of the vehicle 10. Such a fluid discharging mechanism 30 is partially housed within the cavity 12, as shown in FIG. 4. The remote propelling mechanism 20 includes basic controls for maneuvering and braking, as well as additional controls for regulating the operation of the turret 16.

Referring to FIG. 4, the vehicle 10 further includes a mechanism 40 for remotely discharging fire retardant in a concentrated path outwardly and away from the vehicle 10 wherein the fire retardant discharging mechanism 40 and the fluid discharging mechanism 30 are independently and contemporaneously operable such that an operator can treat a target zone with at least one fire fighting agent. The fire retardant discharging mechanism 40 is partially housed within the cavity 12.

Figure 6:
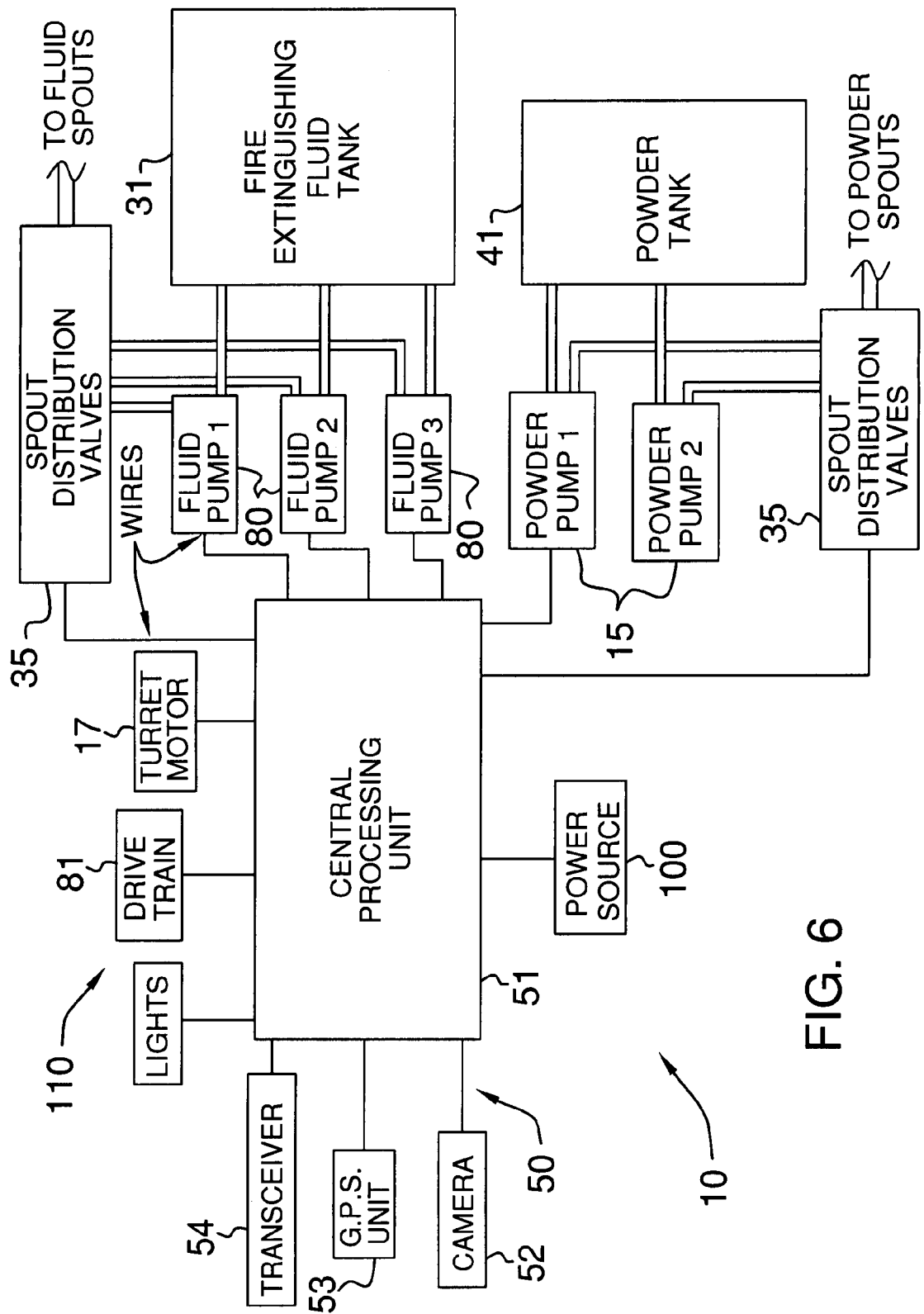
FIG. 6 is a schematic block diagram of the present invention.

Referring to FIGS. 1, 4, and 6, the fire retardant discharging mechanism 40 includes a powder reservoir 41 housed within the cavity 12 and isolated from the central water reservoir (described herein below). A plurality of pumps 15 are electrically mated to the central processing unit (described herein below) and in fluid communication with the powder reservoir 41, as shown in FIG. 6. A plurality of spouts 42 are directly engaged, with no intervening elements, with the body 11 and spaced from the first and second array of water spouts (described herein below) wherein the fire retardant pumps 15 are coupled in series to the powder reservoir 41 and the spout distribution manifold (described herein below) so that each pump 15 can be independently operated.

Referring to FIGS. 4 and 6, a spout distribution manifold 33 is directly coupled, with no intervening elements, to the fire retardant pumps 15 for channeling selected quantities of fire retardant directly to the plurality of fire retardant spouts 42 such that fire retardant can be annularly discharged while water is linearly discharged from the fluid discharging mechanism 30 during operating conditions. This conveniently allows the fire retardant powder to be spread about a wider area, thus extinguishing the surrounding fire more completely than otherwise would be possible. The ability of the fire retardant spouts 42 to annularly discharge the fire retardant powder is critical to the function of the vehicle 10, enabling it to remain closer to wildfires, and thus, more effective at fire-fighting, than if the powder was linearly discharged.

Referring to FIGS. 1, 2, 4, and 6, the vehicle 10 further includes a video surveillance mechanism 50 for remotely capturing images surrounding the target zone such that the operator can monitor the target zone from a safe and remote location. Such a video surveillance mechanism 50 is directly conjoined, with no intervening elements, to the body 10. A central processing unit 51 bears software instructions for causing the vehicle 10 to perform a series of predetermined operations. Such a central processing unit 51 is preferably housed within the cavity 12 and isolated from harsh environmental conditions.

Referring to FIG. 5, the remote propelling mechanism 20 includes a portable and hand-operable controller 21 including a plurality of display screens 22 for simultaneously displaying a plurality of images surroundings the target zone. The controller 21 further includes a pair of joy sticks 23 for allowing the operator to selectively maneuver the vehicle 10 along uneven terrain and further includes a plurality of user-activated controls 24 spaced along a front face 25 of the controller 21 such that the operator can readily toggle the fire retardant discharging mechanism 40 and the fluid discharging mechanism 30 as needed.

Referring to FIGS. 4 and 6, an engine combustion mechanism 70 is seated within the cavity 12 and a drive mechanism 110 is operably connected to the engine combustion mechanism 70 for propelling the vehicle 10 in such a manner that the vehicle 10 can cross over rugged terrain and penetrate high-temperature regions not accessible by human fire fighters. Such an engine combustion mechanism is preferably a diesel motor, as well known in the industry, because of its durability, long life, and the less volatile nature of diesel fuel compared to high octane gasoline commonly found in gasoline engines.

The vehicle 10 may also include a storage container for such fuel, having a removably threadable cap for refilling. Such an engine combustion mechanism preferably includes an air intake device with a filter for preventing airborne contaminants from entering the cavity 12 during operating conditions. Of course, the engine combustion mechanism 70 preferably also includes an exhaust device for releasing exhaust fumes into the atmosphere. It is essential that such intake and exhaust devices be located oppositely from each other so that exhaust fumes do not enter the intake device.

The drive mechanism 110 includes at least one drive train 81 electrically mated to the central processing unit 51 and a plurality of unitary and flexible tracks 82 operably mated to the drive train 81. The tracks 82 are similar to the tracks found on construction vehicles, such as bulldozers, and excavators, as well known in the industry. A plurality of drive wheels 83 are directly engaged, with no intervening elements, with the tracks 82 respectively and a plurality of suspension springs 84 are directly coupled, with no intervening elements, to the drive wheels 83 and are compressible along respective vertical axes.

The fluid discharging mechanism 30 includes a central water reservoir 31 housed within the cavity 12 of the body 11 and a first array 32 of adjustable water spouts directly conjoined, with no intervening elements, to the body 11 and protruding outwardly therefrom along a unidirectional and vertically registered path. A spout distribution manifold 33 includes a plurality of valves 35 directly connected, with no intervening elements, to the central processing unit 51, as shown in FIG. 6.

Still referring to FIG. 6, a plurality of pumps 80 are directly mated, with no intervening elements, with the central water reservoir 31 and the spout distribution manifold 33. Such pumps 80 are electrically coupled to the central processing unit 51 for being selectively activated based upon a user input wherein the pumps 80 are connected in series to the spout distribution manifold 33.

Figure 3:
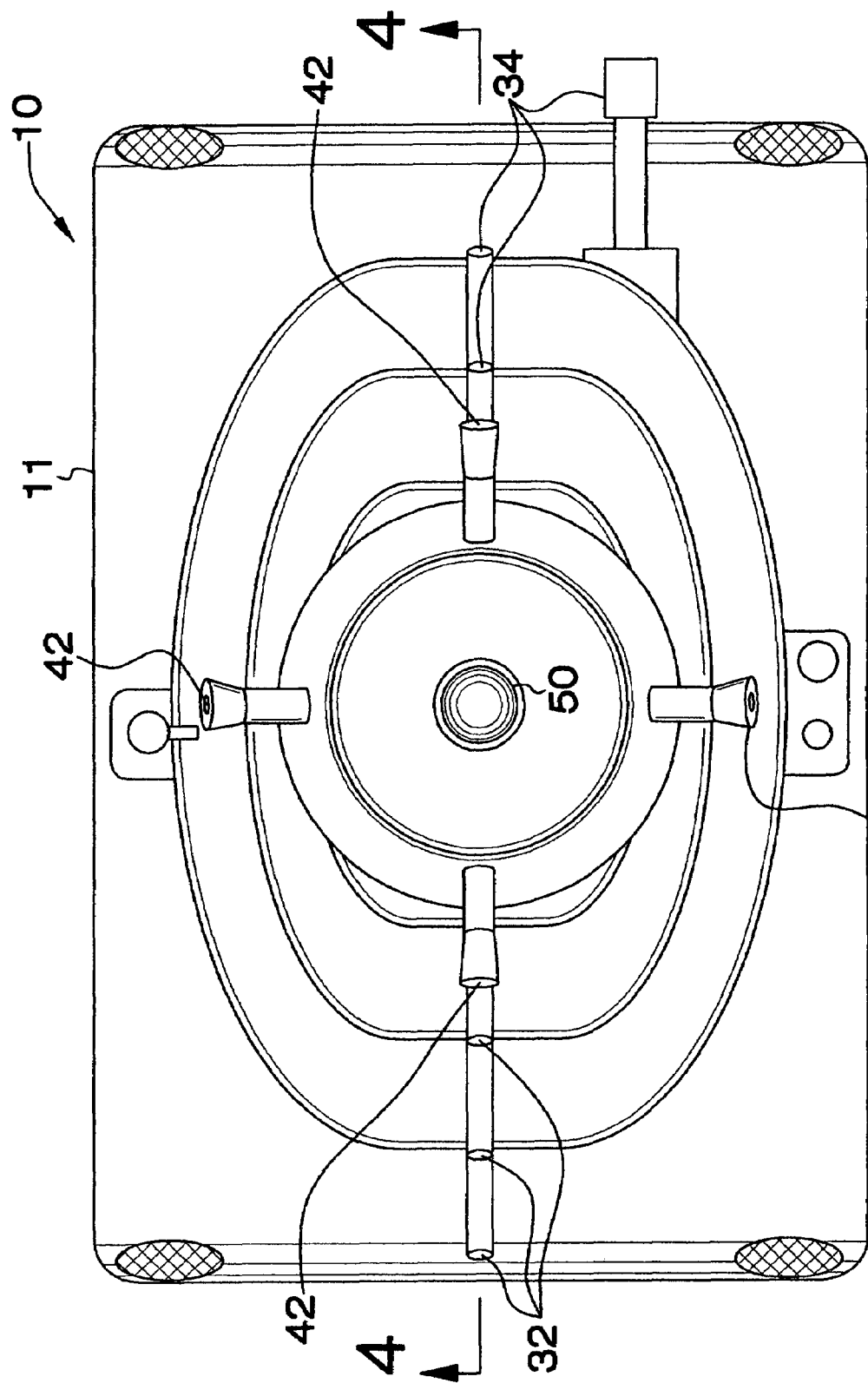
FIG. 3 is a top plan view of the vehicle shown in FIG. 1.

Referring to FIGS. 1, 3, and 4, a second array 34 of adjustable water spouts are directly conjoined, with no intervening elements, to the body 11 and oppositely spaced from the first array 32 of adjustable water spouts such that the first 32 and second 34 array of adjustable water spouts are oppositely directed at 180 degrees.

Referring to FIG. 6, the video-surveillance mechanism 50 includes a camera 52 electrically mated to the central processing unit 51 and remotely operable by the controller 21 and a global positioning satellite unit 53 electrically and directly mated with the central processing unit 51 and cooperating therewith for transmitting and receiving a user input over a dedicated wireless communications link. A transceiver 54 is directly and electrically coupled, with no intervening elements, to the central processing unit 51 and the camera 52 is directly secured to a top surface 13 of the body 11 such that the system can maintain a panoramic view of surrounding areas during operating conditions wherein the video surveillance mechanism 50 generates and wirelessly transmits video signals to a central monitoring station such that an operator can remotely view a current state of the surround areas at a safe distance therefrom.

Referring to FIG. 4, the body 11 further includes a turret section 16 rotatably mounted on the body 11 so that the turret section 16 can be positioned along a 360 degree path and a motor 17 and a gear 18 operably mated therewith in such a manner that the gear 18 is directly engaged, with no intervening elements, with an inner serrated edge 19 of the turret section 16. The motor 17 is statically fixed to the cavity 12 and causes the turret section 16 to rotate during operating conditions.

The vehicle 10 may also include a plurality of light emitting devices for illuminating a surrounding area of the vehicle 10 so it can be operated at night or in smoky conditions. Such devices are preferably covered by wire mesh or other protective covering that allows light to be projected, yet protects the devices from debris that may come into contact therewith.

The vehicle 10 allows fire-fighting personnel to combat wildfires in locations that may otherwise be too dangerous for firefighters. The large capacity of its reservoir 31 enables it to stay in the field for long periods of time without having to refill, thus saving time and reducing costs.

In operation, the vehicle 10, such as a tank, contains a triggerable location-reporting video-surveillance system. The system is most likely hidden somewhere in the vehicle 10, and may even be integrated into the body 11 or the engine. For example, the system's components may be integrated into the vehicle's Primary Computer Module. The components can either be connected to the power source associated with the vehicle 10, such as the battery 100, or it may have a self-contained power source or sources.

The system receives a page from a paging satellite (not shown) preferably initiated by personnel or some automatic device located at the service provider (not shown). The page request can be initiated from any source, such as a hand-operable and portable controller or an enterprise communication system as well known in the industry, for example. The service provider transmits encoded regulating signals for controlling the speed and direction of travel of the vehicle passing through the target zone surrounding the wild fires. For example, a police station or fire station may request that the service provider locate any and all pedestrian and building which are located proximate the target zone and threatened by the wild fires, which can quickly change direction depending on weather conditions, for example. The service provider's response is to send a page to a central monitoring station so that local or state highway control personnel can remotely monitor the status of the wild fire.

The page need not originate in the paging satellite but can originate in any system capable of sending out pages. For example, a cellular network may be capable of sending out pages and could be used instead of the paging satellite. Further, the system need not use a page to communicate between the service provider and the vehicle 10 but can use any system that allows the service provider to uniquely address the vehicle 10 via a broadcast signal. For example, very low frequency signals or HF radio signals could be used to communicate between the service provider and the vehicle 10.

When the central station receives the page, it determines the vehicle location and direction of movement by accessing the signals of the GPS system, which comprises a plurality of satellites (not shown) and an on-board GPS unit 53 broadcasting signals which can be used to determine an object's location heading anywhere on the earth, as well known in the industry. The central station then formats the location information into a cellular telemetry stream and transmits it via the cellular system's telemetry channels. Advantageously, a policeman or fireman, for example, can manually activate and deactivate the system 10 via a conventional hand-operable cellular telephone, as described hereinbelow.

In the AMPS (Advanced Mobile Phone System) cellular system, which is the analog cellular system used in the United States, each cellular base station has 832 channels. The 832 channels are divided among at least two competing cellular carriers. Each cellular carrier uses 21 of the 416 channels to carrying control signals. Each control channel includes a Forward Control Channel (FOCC) and a Reverse Control Channel (RECC).

The cellular base station uses the FOCC to send information to cellular telephones and the cellular telephones send information back to the cellular base station via the RECC. The FOCC and RECC are used to establish a cellular telephone call through a local switch. Once the cellular telephone call is established, the call is moved to one of the non-control channels and the released control channel is made available to establish other cellular telephone calls.

The cellular base station broadcasts a System Identification ("SID") signal, which identifies the cellular system to cellular telephones receiving it. When a cellular telephone is turned on, it compares the SID signal it receives against a SID stored within the telephone, which identifies the cellular telephone's home system. If the received SID is not the same as the stored SID, the cellular telephone is "roaming" and the "roam" indicator on the telephone is illuminated.

Subsequently, the cellular telephone transmits its identity to the cellular base station via the RECC. The RECC transmission includes the telephone's Mobile Identification Number ("MIN"), which is a unique 10-digit number (analogous to a telephone number including an area code) that is programmed into the cellular telephone. The first six digits of the MIN identify the cellular telephone's home system. The RECC also includes an Electronic Serial Number ("ESN"), a unique 32-bit serial number permanently stored in the cellular telephone which uniquely identifies the cellular telephone.

The cellular base station will receive the MIN and ESN through the RECC and determine that the MIN does not correspond to a local number. Using the MIN, the cellular base station will determine the home system for the cellular telephone and send a validation signal to that system. The cellular local switches in the United States are interconnected through the Intersystem Signaling Network, IS-41, which allows them to send and receive validation information.

The validation signal, known under IS-41 as a Registration/Notification Invoke (REGNOT) message, includes the cellular telephone's MIN and ESN. The REGNOT message also includes the identity of the cellular base station sending the message. The cellular telephone's home system will respond with a Registration/Notification Return Result (REGNOT) message. In the REGNOT message, the cellular telephone's home system will either indicate that it will take financial responsibility for calls made by the cellular telephone or it will refuse to validate the cellular telephone. If validation occurs, a subsequent exchange of messages establishes the features (such as call forwarding) available to the cellular telephone.

The validation process just described uses the cellular system's control channels. Again, once a cellular telephone call is initiated the control channel that was used to set up the call is released for other purposes.

Returning to FIG. 6, upon receipt of the page from GPS satellite, the control system (transmitter controller) determines the location and direction of movement, if any, of vehicle 10 using the GPS signals from the GPS system 20. The apparatus then formats the location and movement information into the payload portion of a cellular RECC signal and transmits it to a local cellular base station. The MIN portion of the RECC signal may contain a unique MIN or it may be a MIN that is common to all triggerable location-reporting apparatus serviced by a common service provider. Alternatively, the MIN may be different for each of the apparatus. The service provider can now communicate the location of the vehicle 10 to the control station, lienholder, police or any other regulatory agency.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A remotely operable vehicle for use in fighting dangerous and widespread fires, said vehicle comprising:
   a rigid and secure body formed from fire-resistive material sized and shaped as a tank, said body defining a cavity therebeneath wherein the cavity is safely isolated from the environment during operating conditions;
   means for remotely propelling said vehicle during operating conditions;
   means for remotely discharging fluids outwardly from said vehicle, said fluid discharging means being partially housed within the cavity;
   means for remotely discharging fire retardant in a concentrated path outwardly and away from said vehicle, wherein said fire retardant discharging means and said fluid discharging means are independently and contemporaneously operable such that an operator can treat a target zone with at least one fire fighting agent, said fire retardant discharging means being partially housed within the cavity;
   video surveillance means for remotely capturing images surrounding the target zone such that the operator can monitor the target zone from a safe and remote location, said video surveillance means being directly conjoined to said body; and
   a central processing unit bearing software instructions for causing said vehicle to perform a series of predetermined operations, said central processing unit being housed within the cavity and isolated from harsh environmental conditions.

2. The vehicle of claim 1, wherein said remote propelling means comprises:
   a portable and hand-operable controller including a plurality of display screens for simultaneously displaying a plurality of images surroundings the target zone, said controller further including a pair of joy sticks for allowing the operator to selectively maneuver said vehicle along uneven terrain, said controller further including a plurality of user-activated controls spaced along a front face of said controller such that the operator can readily toggle said fire retardant discharging means and said fluid discharging means as needed;
   engine combustion means seated within the cavity;
   drive means operably connected to said engine combustion means for propelling said vehicle in such a manner that said vehicle can cross over rugged terrain and penetrate high-temperature regions not accessible by human fire fighters.

3. The vehicle of claim 2, wherein said drive means comprises:
   at least one drive train electrically mated to said central processing unit;
   a plurality of unitary and flexible tracks operably mated to said drive train;
   a plurality of drive wheels directly engaged with said tracks respectively; and
   a plurality of suspension springs directly coupled to said drive wheels and being compressible along respective vertical axes.

4. The vehicle of claim 3, wherein said fluid discharging means comprises:
   a central water reservoir housed within the cavity of said body;
   a first array of adjustable water spouts directly conjoined to said body and protruding outwardly therefrom along a unidirectional and vertically registered path;
   a spout distribution manifold including a plurality of valves directly connected to said central processing unit;
   a plurality of pumps directly mated with said central water reservoir and said spout distribution manifold, said pumps being electrically coupled to said central processing unit for being selectively activated based upon a user input, wherein said pumps are connected in series to said spout distribution manifold; and
   a second array of adjustable water spouts directly conjoined to said body and oppositely spaced from said first array of adjustable water spouts such that said first and second array of adjustable water spouts are oppositely directed at 180 degrees.

5. The vehicle of claim 4, wherein said video-surveillance means comprises:
   a camera electrically mated to said central processing unit and remotely operable by said controller;
   a global positioning satellite unit electrically and directly mated with said central processing unit and cooperating therewith for transmitting and receiving a user input over a dedicated wireless communications link; and
   a transceiver directly and electrically coupled to said central processing unit;
   said camera being directly secured to a top surface of said body such that said system can maintain a panoramic view of surrounding areas during operating conditions, wherein said video surveillance means generates and wirelessly transmits video signals to a central monitoring station such that an operator can remotely view a current state of the surrounding areas at a safe distance therefrom.

6. The vehicle of claim 5, wherein said body further comprises:
   a turret section rotatably mounted on said body so that said turret section can be positioned along a 360 degree path; and
   a motor and a gear operably mated therewith in such a manner that said gear is directly engaged with an inner serrated edge of said turret section, said motor being statically fixed to the cavity and causing said turret section to rotate during operating conditions.

* * * * *